April 3, 1934.   W. S. GRAHAM   1,953,402
TOOL FOR BORING AND FACING CYLINDERS AND THE LIKE
Filed Sept. 20, 1930   2 Sheets-Sheet 1
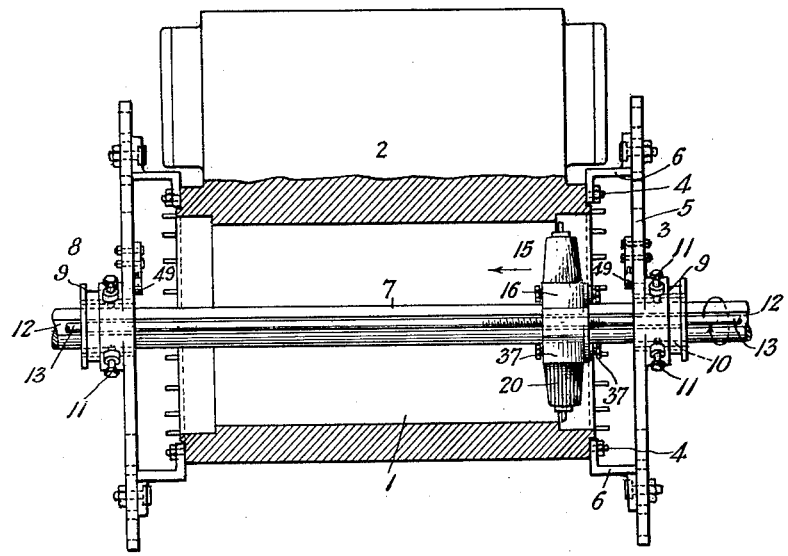
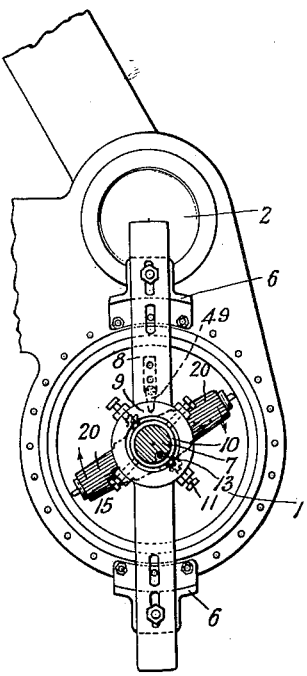
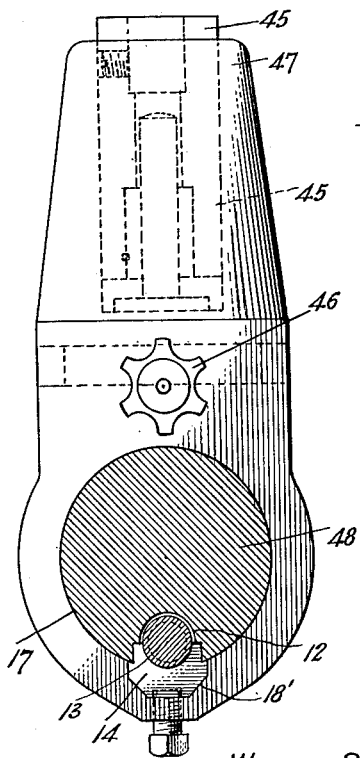
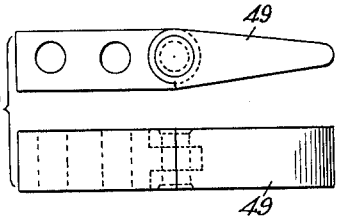
Inventor
WILLIAM S. GRAHAM
By Parker Cook.
Attorney April 3, 1934.  W. S. GRAHAM  1,953,402
TOOL FOR BORING AND FACING CYLINDERS AND THE LIKE
Filed Sept. 20, 1930  2 Sheets-Sheet 2
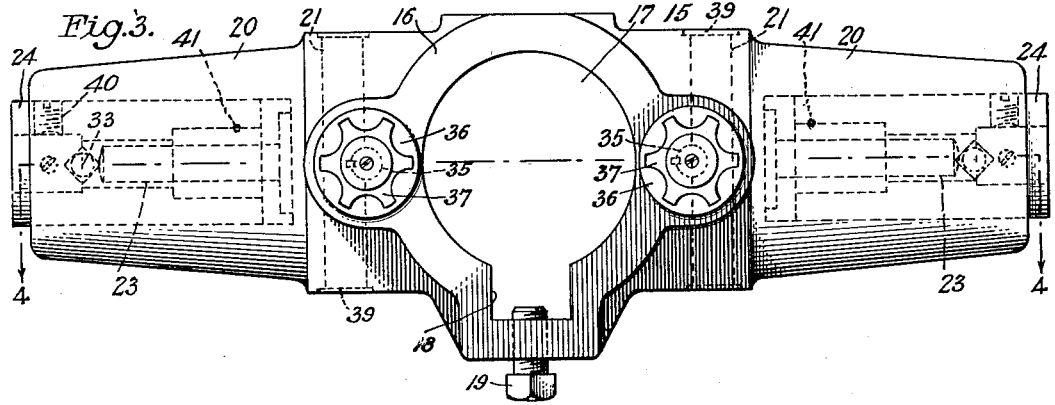
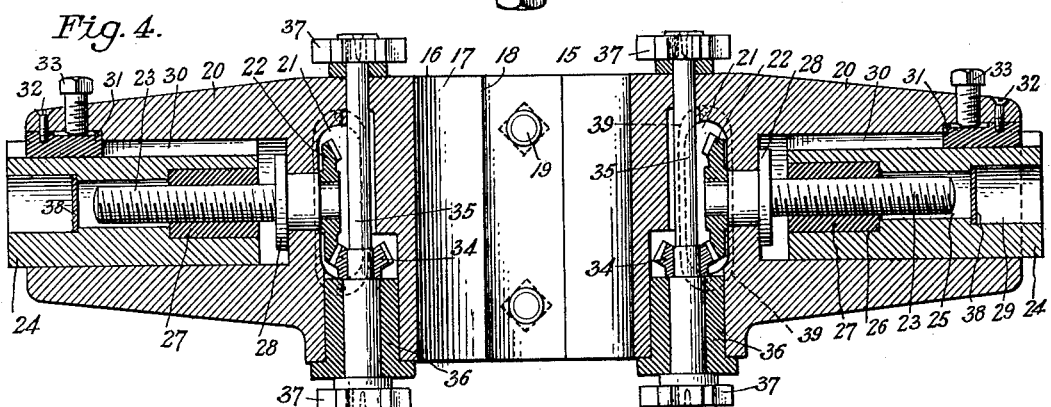
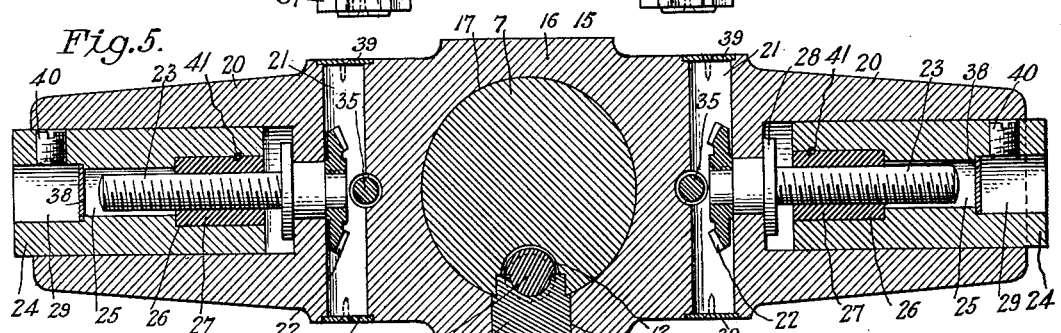
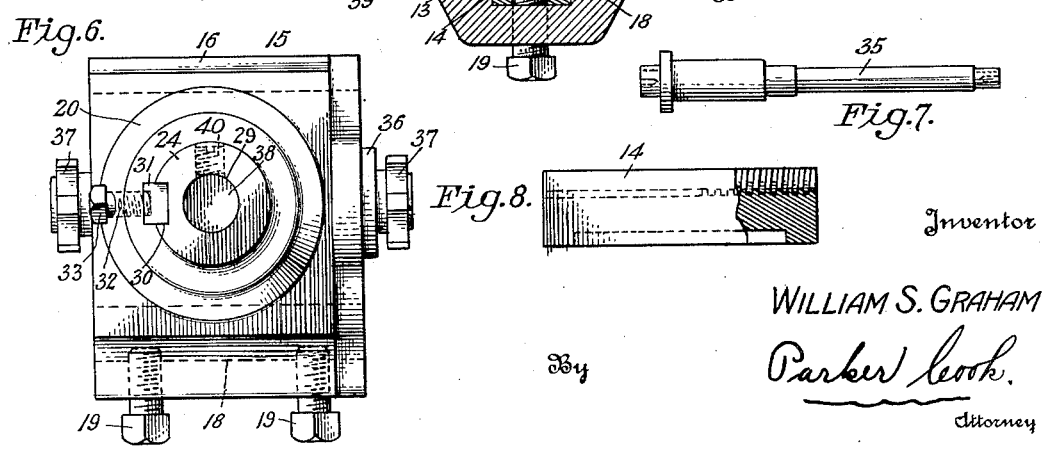
Inventor
WILLIAM S. GRAHAM
By Parker Cook
Attorney Patented Apr. 3, 1934

1,953,402

UNITED STATES PATENT OFFICE 1,953,402

TOOL FOR BORING AND FACING CYLINDERS AND THE LIKE

William S. Graham, Tampa, Fla., assignor of one-third to Conrad L. Meister, Wilmington, N. C., and one-third to James Grant, Tampa, Fla.

Application September 20, 1930, Serial No. 483,353

3 Claims. (Cl. 77—58)

My invention relates to new and useful improvements in a cylinder boring and facing head for portable boring bars and the like, and has for an object to provide a device that is especially designed for boring or reboring out cylinders of locomotives and also facing the ends so that a steam tight joint can be obtained for the cover or lid, the latter being accomplished without removing the cutter head from within the cylinder after the device has been set up.

Still another object of the invention is to provide a boring or cutting and facing head that is especially adapted as a portable boring bar to be used in the boring of steam cylinders for locomotives, although the tool as designed is adaptable for use on other machines, such as boring mills, vertical lathes or other machines of similar type.

Still another object of the invention is to provide a form of tool holder or cutter head that permits the operator after once setting up the assembly to make rough, fine and finishing cuts through the cylinders and then face off the end or ends to thus make a steam tight joint for the heads without taking down the machine and resetting or using a separate machine for the refacing.

As is well known to those skilled in the art, it is not necessary, under the present practice, to remove locomotive cylinders that have been cracked or broken, as they may often be patched up with the use of oxyacetylene or electric welding, but after such patching the cylinders are rebored and faced, and this reboring and facing is generally accomplished by first, the use of a portable boring bar which is then removed and a special facing tool then utilized.

Another object of the present invention, therefore, is to provide a form of portable boring bar in which there is a rotary cutter head, which boring bar is to be secured or bolted in the cylinder in a manner hereinafter described, and wherein the tools in the ends of the cutter head may be quickly adjusted after each cut, so that rough and fine cuts may be made without in any way disturbing the drive shaft or supporting member for the cutter head, and finally either end of the cylinder may be faced at absolutely right angles to the bore to make a steam tight joint, this being done without in any way disturbing the axial alignment of the cutter head.

Still another object of the invention is to provide a cutter head and portable boring bar wherein means are provided for advancing or retracting the cutting tools located in the ends of the cutter head without the use of tools or without removing the cutter head from the cylinder head or in any way changing the cross heads or other parts of the device.

Still another object of the invention is to provide a boring tool in the form of a portable boring bar with a movable cutter head thereon, so that the tool holders and the cutting or facing tools therein may be either quickly adjusted by hand, after the machine is set up, or means may be provided whereby the cutting tools may be automatically radially advanced, if so desired.

Still another object of the invention is to provide a cutting tool for boring locomotive cylinders wherein after the cylinder has been properly bored, the small cutting tools may be quickly adjusted to face the end or ends of the cylinder to make steam tight joints for the covers or heads, without in any way changing the axial alignment of the cover heads.

Still another object of the invention is to provide a cutting tool which is adaptable for quickly and accurately facing the steam joint of a boiler dome or, in fact, the face of any hollow cylindrical object.

Still another object of the invention is to provide a form of tool holder or cutter head wherein the tools may be advanced or adjusted for cuts of different degrees, and wherein all of the adjustable parts are fully protected from the chips or borings, so that the life of the tool will not be affected by long and constant service.

With these and numerous other objects in view, which will more clearly appear as the specification proceeds, the invention consists in certain new and novel arrangements and combination of parts, as will be hereinafter more fully described and pointed out in the claims.

Referring now to the drawings showing a preferred embodiment and a slight modification, Fig. 1 is a fragmentary side elevation of a valve chamber and cylinder, the walls of the cylinder being broken away to show the improved boring and cutter head in place;

Fig. 2 is an end view of the same and showing the manner of clamping the boring driving shaft and the cutter head in position;

Fig. 3 is a top plan view of the cutter head or boring tool before the same is applied to the bar or drive shaft;

Fig. 4 is a vertical sectional view taken on the line 4—4 of Fig. 3 looking in the direction of the arrows;

Fig. 5 is a sectional view taken at right angles to Fig. 4 and showing the central supporting or drive shaft and feed shaft in position;

Fig. 6 is an end view of the improved cutter head;

Fig. 7 is a detail of one of the star wheel spindles;

Fig. 8 is a fragmentary view of the boring bar key or nut;

Fig. 9 shows a slight modification of the cutting head, this being a single tool holder rather than a double one; and Fig. 10 is a side and edge view of a small trip arm that may be used to actuate the star wheel feeds of the tool holders in the cutter head.

Referring now specifically to the several views, and to Fig. 1 for the moment, there is fragmentarily shown a cylinder 1, the steam valve chest 2 and my improved boring or cutting and facing head in position within the cylinder.

There will be noticed a cross head 3 bolted in position, as at 4, to the bolts at the end of the cylinder head, and this cross head may be of any desired type or construction, so that it may be properly bolted or clamped to the end of the cylinder. As shown in the drawings, it may consist of an arm 5 with the adjustable ears 6 which are to be bolted as shown, so that the central supporting bar or drive shaft 70 may be adjusted within the cylinder to provide the axial alignment for the cutter head.

To the rear of the cylinder will also be seen a similar cross head 8 that may in turn support the rear end of the bar or shaft 7 and this, too, may be tightly and accurately adjusted in place.

Each one of these cross heads also has an adjustable centering device which consists of a hub 9, in which there will be spaced a small collar 10, which is to be centered by the adjustable screws 11, so that after the cross heads are bolted in place and thus roughly adjusted, the shaft through the collar 10 may be more accurately and perfectly centered by the adjustment of these screws 11.

As heretofore mentioned, I do not wish to be in any way limited to these cross heads or clamps for the center supporting bar, as other forms might be equally as well used.

Now the bar or shaft 7 is also bored throughout its length and at a point in its periphery, as at 12, for the reception of a feed screw 13 which, in turn, is in threaded cooperation with a boring bar nut 14, as may be seen in Figs. 5 and 8.

As will be noticed in Fig. 1, I have not shown the means for revolving the shaft 7, nor the means for revolving the feed screw 13, but any form of gearing may be used to drive this shaft 7 at cutting speed and likewise the feed screw 13 for advancing the cutter head, which cutter head will shortly be explained.

It will be understood that if used with a motor, reduction gearing and reversing mechanism may be necessary, but in any event the exact means for turning this driving shaft and feed screw is not a part of the invention and any preferred arrangement may be used.

Now referring more particularly to the cutter head 15, as shown in Figs. 3 to 5, it will be seen that it consists of the central or body portion 16 with the hollow hub 17 to snugly fit about the driving shaft, and is also cut out, as at 18, to receive the heretofore mentioned boring bar nut 14, which latter is held in position by the two screws 19.

As far as the specification has proceeded, it will be seen that when the shaft 7 is revolved, the cutter head 15 will likewise be revolved, and as the feed screw 13 is revolved, it will advance or retract the cutter head, due to the engagement of the feed screw with the boring bar nut. Means, of course, will be provided for regulating the revolutions of the feed screw, so that the cutter head may be advanced or retracted at any desired cutting speed.

Extending outwardly from the body portion are the two similar ends or housings 20, and a description of the one will be a description of the other.

First, however, it will be noticed that there are two like slots 21 in the body portion, (see Figs. 4 and 5) so that a small bevel gear 22 may be dropped in each slot and then fitted on the rear end of a threaded pintle or feed screw 23.

Each housing or end is centrally bored to receive a slidable tool holder 24. Each tool holder has the bore 25 and is counterbored as at 26 to receive the feed nut 27 which is secured to the tool holder 24 by means of a rivet or pin 41, which nut engages with the feed screw 23, so that the tool holder 24 may be advanced or retracted as the feed screw 23 is turned. This feed screw 23 has a small flange 28 thereon, so that the gear 22 on its one end and the adjacent flange 28 will limit the thrust movement of the same.

Referring for the moment to the slidable tool holder 24, it will also be seen that it is slightly counterbored as at 29 to receive the end of a tool or smaller tool holder (not shown).

Now this tool holder 24 is provided with a key slot 30, in which will fit the small key 31, which latter is held within the end of the housing by the lock screw 32, while an adjustable set screw 33 is also fitted within the end of the housing and into the key 31, so that this adjustable tool holder 24 may be locked, if so desired.

For operating the gear 22 to move the tool holder in and out of its housing, there will be noticed the pinion 34 mounted on the pintle 35, which latter extends completely through the body of the cutter head. This pintle 35 is mounted in the bushing 36, which bushing, of course, fits in a receptive chamber formed in the cutter head. By utilizing a bushing, the pinion will be held in meshing relation with the gear 22 and the former may be conveniently placed or set within its chamber.

Now the pintle 35 has a star wheel 37 properly secured at its opposite ends, so that a slight turning of either of these star wheels 37 will move the tool holder 24 through the turning of the two gears, and the threaded feed screw will advance or retract the tool holder, depending on the direction in which the star wheel or star wheels are turned.

The opposite end of the cutter head is identically formed, there being the similar sliding tool holder, the similar pintle with the star wheels thereon, the like intermeshing gears and the feed screw for the tool holder.

It will be noticed that in the counterbore 29 there is the small disk 38, so that none of the chips or metal will work down into the feed nut or feed screw, and in a like manner a little plate 39 may be seen in position over each slot which houses the respective gear wheels 22, thus keeping all foreign substances out of the adjusting mechanism of the cutter head.

In Fig. 5 may be seen the little set screws 40 for holding the cutting tools or further tool holders in position, and it will only be necessary to turn the star wheel to drive the adjustable tool holder outwardly, so that this set screw 40 may be locked on an inserted tool or tool holder.

As heretofore mentioned, the opposite ends of the cutter head are identical, but it will be noticed that the slidable tool holders are to be independently adjustable.

Now referring for the moment to the modification shown in Fig. 9, this is a single ended cutter head rather than a double cutter head.

and it will be noticed that there is only one slidable tool holder 45, but it is similar in all respects to either one of the tool holders in the double cutter head. The little star wheel adjustment 46, however, is equidistant from the longitudinal center line of the assembly, and the bore 18' is positioned directly to the rear of the cutter head, so that the opposite side faces of the cutter head may be similar in outline, thus making it immaterial which way the cutter head is put on the bar, so that the cut may be made close to the inside of a cylinder wherein the back head is not to be removed.

The operation of the device is exceedingly simple.

Operation

After the cutter head (preferred form) is properly centered within the cylinder, the driving shaft or supporting bar is revolved to thus revolve the cutter head, and the adjustment of the feed for this cutter head will be set as desired.

The cutter head will traverse the cylinder, and assuming the star wheels have been so adjusted that the cutting tools will make a rough cut, before retracting the cutter head, the operator may reach in the cylinder head (from either end) and turn the star wheels the desired amount to advance the tool holders and cutting tools to make a slightly finer cut.

Now after the cutter head has bored the cylinder, a very slight adjustment of the star wheels may then be made to provide the last and finishing cut.

Each adjustment, as will be seen, can be made without in any way changing the axial alignment of the cross head and without bodily moving any of the parts, it being only necessary for the mechanic to reach in from either end and adjust the small star wheel or wheels, this being done without the use of wrenches.

Now if it is desired to face one end or both ends of the cylinders, this can also be done without in any way changing the set up of the cutter head, as the cutter head would be driven to either end of the cylinder and the feed screw 13 disengaged, so as not to actuate the cutter head.

Thus, it will be seen that not only may the cylinders be carefully rebored without ever changing the centers of the cutter head, but likewise either end of the cylinders desired may be faced so that a steam tight joint will be secured for the cylinder or dome head.

It will also be appreciated that the facing will be done absolutely at right angles to the bore of the cylinder, as the axial alignment will not be changed, and that a perfectly tight steam joint is obtained.

I have also provided automatic means for rotating the star wheel if desired, which consists of a small trip bar 49 which will be removably mounted on the respective cross head, so that as the cutter head is revolved, the trip 49 will successively engage the teeth of the respective star wheels to thus slightly advance the slidable tool holder at each successive rotation.

The trip arm may be utilized as desired or the star wheel may be turned by hand, as will be readily understood.

Now the operation of the single ended cutter head is identical to the operation just described, but in this instance, of course, there is only one slidable tool holder to adjust within the cutter head.

In most instances, a double ended cutter head will be used, as two tools on directly opposite sides of the cutter bar or drive shaft will produce the best results.

Although I have shown and described a single and double ended cutter head, it will be understood that it comes within the province of the invention to form a like triple ended cutter head or even one with more than three ends.

From the foregoing, it will be seen that I have produced a boring and facing device, which is especially adaptable for use in the boring and facing of locomotive cylinders and which is much more accurate and capable of much finer and quicker adjustment than devices of a somewhat similar nature now in use. In fact, the device described combines boring and facing with the one tool and without in any way changing the set up or axial alignment to thus produce better results.

It will be understood, also, that this cutter head might be well utilized for other purposes than boring cylinders and might be adaptable in many places where a revolvable cutter head is necessary.

I am aware that it is old to provide locomotive boring bars which are to be clamped to the cylinders, but in all of these devices with which I am familiar, it is necessary to change the centers or to remove the bar when it is desired to face the end or the ends of the cylinders and in that way the facing is not always absolutely at right angles to the bore of the cylinders.

Furthermore, the present machine does not have to be stopped when it is desired to adjust the cutters, as if the cutter heads are moving at a slow rate, the operator, without the use of any tools, may place his arm within the cylinder and adjust the star wheels to thus adjust the cutting tools.

Many slight changes might be made without in any way departing from the spirit and scope of the invention.

Having thus described my invention, what I claim as new and desire to secure by Letters Patent is:

1. A boring and facing device for cylinders comprising a portable drive shaft, adjustable means for supporting said shaft centrally within the cylinder, a cutter head mounted on said shaft, said cutter head provided with slidable tool holders, centrally located feed screws within the cutter head for radially advancing and retracting said tool holders, means extending within the cutter head parallel with said drive shaft for operating said feed screws and means intermittently contacting with said last-mentioned means whereby said tool holders are independently radially moved with every revolution of said cutter head, a feed screw associated with said drive shaft revolving about the axis of the drive shaft but not revolving about its own axis when the device is used for facing, a feed screw nut used as a spline allowing the cutter head to revolve though not moving in a longitudinal direction during the facing operation, the said feed screws of the slidable tool holders being wholly encased within the cutter head to thereby prevent any of the borings or facings from contacting with said parts.

2. A cutter head for boring machines and the like consisting of a body portion having a hub, said hub provided with a recess adapted to receive means for causing said cutter head to rotate and advance along a boring bar, arms extending radially from the body portion and each of said arms including a housing, a slidable tool holder mounted in said housing, a feed screw located within said housing and having its one end extending into the tool holder, said tool holder threaded to receive the same, a thrust plate on said feed screw and in contact with the rear wall of the housing formed in said arm, the feed screw provided on its inner end with a gear, pintles mounted in the body portion and each provided with a pinion, said pinions meshing with the respective gears on the said feed screws, grasping means on each of the pintles for advancing and retracting their respective tool holders, the said grasping means mounted on the outside of the body portion and the said tool holders capable of being independently operated, the feed screws, threaded portion of the tool holders, gears, pinions and thrust plates all being wholly encased within said arms and body portion to thereby prevent any of the borings from contacting with said parts and to withhold any lubricant placed about the said parts.

3. A facing device for cylinders including a portable shaft, adjustable means for supporting the shaft centrally within the cylinders and said means adapted to be attached to the cylinders, a cutter head mounted on said shaft and a recess in the cutter head adapted to hold a threaded nut for permitting an advance and rotation along the portable shaft, said cutter head provided with chambers for internally slidable tool holders, tool holders, feed screws in said chambers engaging said tool holders, a gear, pinion and pintle associated with the respective feed screws for advancing and retracting the said tool holders, means on the respective pintles extending without the cutter head for independently operating said feed screws, means for intermittently contacting with said last-mentioned means whereby the tool holders are independently radially moved with every revolution of said cutter head, the said feed screws, gears, pintles, with the exception of the ends thereof, and pinions being wholly encased within the cutter head to thereby prevent the chips of the facing operation from contacting with said parts.

WILLIAM S. GRAHAM.